US012183185B2

(12) United States Patent
Cho

(10) Patent No.: US 12,183,185 B2
(45) Date of Patent: Dec. 31, 2024

(54) FIRE ALARM APPARATUS

(71) Applicant: ROZETATECH Co., Ltd., Seongnam-si (KR)

(72) Inventor: Youngjin Cho, Okcheon-gun (KR)

(73) Assignee: ROZETATECH Co., Ltd., Seongnam-si (KR)

( * ) Notice: Subject to any disclaimer, the term of this patent is extended or adjusted under 35 U.S.C. 154(b) by 10 days.

(21) Appl. No.: 17/908,460

(22) PCT Filed: Mar. 4, 2021

(86) PCT No.: PCT/KR2021/002701
§ 371 (c)(1),
(2) Date: Aug. 31, 2022

(87) PCT Pub. No.: WO2021/177755
PCT Pub. Date: Sep. 10, 2021

(65) Prior Publication Data

US 2023/0343203 A1 Oct. 26, 2023

(30) Foreign Application Priority Data

Mar. 5, 2020 (KR) ........................ 10-2020-0027799

(51) Int. Cl.
*G08B 17/00* (2006.01)
*G08B 25/00* (2006.01)

(52) U.S. Cl.
CPC ........... *G08B 25/009* (2013.01); *G08B 17/00* (2013.01); *G08B 25/003* (2013.01)

(58) Field of Classification Search
None
See application file for complete search history.

(56) References Cited

U.S. PATENT DOCUMENTS

2005/0190055 A1* 9/2005 Petite ..................... G08B 17/10 340/506
2006/0152356 A1* 7/2006 Yang ...................... G08B 17/00 340/584

(Continued)

FOREIGN PATENT DOCUMENTS

JP H09-190588 A 7/1997
JP 2004-355544 A 12/2004

(Continued)

OTHER PUBLICATIONS

International Preliminary Report on Patentability mailed on Sep. 15, 2022, from International Application No. PCT/KR2021/002701, filed on Mar. 4, 2021, 11 pages.

(Continued)

*Primary Examiner* — John F Mortell
(74) *Attorney, Agent, or Firm* — HoustonHogle LLP

(57) ABSTRACT

A fire alarm apparatus according to an embodiment of the present invention may include a plurality of sensing modules and a repeater. When receiving the fire alarm signal from each of the plurality of sensing modules, the repeater transmits a signal to each of the plurality of sensing modules after a first time elapses, the signal comprises an acknowledgment response to the fire alarm signal and a control signal for controlling each of the plurality of sensing modules, and the acknowledgment response and the control signal are transmitted integrally.

14 Claims, 8 Drawing Sheets

(56) References Cited

U.S. PATENT DOCUMENTS

| | | | | |
|---|---|---|---|---|
| 2008/0303654 | A1* | 12/2008 | Kates | H04W 52/0225 340/539.3 |
| 2016/0021669 | A1* | 1/2016 | Tetzlaff | H04L 1/00 370/278 |
| 2016/0165524 | A1* | 6/2016 | Kim | H04W 48/16 370/338 |

FOREIGN PATENT DOCUMENTS

| | | | |
|---|---|---|---|
| JP | 2012-234442 | A | 11/2012 |
| KR | 10-0618051 | B1 | 8/2006 |
| KR | 10-2017-0003377 | A | 1/2017 |
| KR | 10-1719722 | B1 | 3/2017 |
| KR | 10-1790303 | B1 | 10/2017 |
| KR | 10-2019-0042503 | A | 4/2019 |
| KR | 10-2188138 | B1 | 12/2020 |

OTHER PUBLICATIONS

International Search Report of the International Searching Authority, mailed on Jun. 10, 2021, from International Application No. PCT/KR2021/002701, filed on Mar. 4, 2021. 7 pages.

* cited by examiner

FIRE ALARM APPARATUS

RELATED APPLICATIONS

This application is a § 371 National Phase Application of International Application No. PCT/KR2021/002701, filed on Mar. 4, 2021, now International Publication No. WO 2021/177755, published on Sep. 10, 2021, which International Application claims priority to Korean Application 10-2020-0027799 filed on Mar. 5, 2020, both of which are incorporated herein by reference in their entirety.

TECHNICAL FIELD

The present invention relates to a fire alarm apparatus, and more particularly, to a fire alarm apparatus in which when a plurality of sensing modules transmit a fire occurrence signal to a repeater, the repeater transmits a signal composed of an acknowledgment response and a control signal to the plurality of sensing modules such that the amount of traffic is reduced by reducing the amount of signals transmitted and received between the plurality of sensing modules and the repeater.

BACKGROUND ART

In general, a fire alarm apparatus is installed in a building to reduce human casualties in case of fire. This fire alarm apparatus may notify the occurrence of a fire to a person concerned or a resident in a building when a fire is automatically detected through a sensor that detects heat, smoke, flame, and the like generated by a fire. However, in the conventional fire alarm apparatus, when a fire occurs, the amount of traffic increases as the amount of signals communicated between the plurality of sensing modules and the repeater increases, thereby reducing signal transmission reliability.

DISCLOSURE OF THE INVENTION

Technical Problem

An object of the present invention is to provide a fire alarm apparatus in which when a plurality of sensing modules transmit a fire occurrence signal to a repeater, the repeater transmits a signal composed of an acknowledgment response and a control signal to the plurality of sensing modules such that the amount of traffic is reduced by reducing the amount of signals transmitted and received between the plurality of sensing modules and the repeater and the reliability of signal delivery by reduced traffic volume is improved.

Technical Solution

A fire alarm apparatus according to an embodiment of the present invention includes a plurality of sensing modules configured to generate a fire alarm signal by detecting fire occurrence with different address values and perform Radio Frequency (RF) communication with each other, and a repeater configured to perform RF communication with each of the plurality of sensing modules and receive the fire alarm signal from the plurality of sensing modules. When receiving the fire alarm signal from each of the plurality of sensing modules, the repeater transmits a signal to each of the plurality of sensing modules after a first time elapses, wherein the signal includes an acknowledgment response to the fire alarm signal and a control signal for controlling each of the plurality of sensing modules, wherein the acknowledgment response and the control signal are transmitted integrally.

The control signal may initialize states of the plurality of sensing modules.

A magnitude of the fire alarm signal may be greater than a magnitude of the signal.

The first time may be a short inter-frame space (SIFS).

When the signal is not received, each of the plurality of sensing modules may retransmit the fire alarm signal to the repeater after a second time.

The second time may be 1 minute.

When the signal is received, each of the plurality of sensing modules may stop transmitting the fire alarm signal.

The fire alarm apparatus may further include a server communicating with the repeater.

Each of the plurality of sensing modules may include a sensor configured to generate the fire alarm signal when it is determined as a fire situation by detecting at least one of smoke, temperature, humidity, and gas, a sensing memory unit configured to store the address value, an amplification unit configured to amplify the fire alarm signal received from at least one of a plurality of adjacent sensing modules to generate an amplified fire alarm signal, and a sensing communication unit configured to receive the fire alarm signal or the amplified fire alarm signal, transmit the fire alarm signal or the amplified fire alarm signal to at least one of the plurality of adjacent sensing modules and the repeater, and receive the signal.

The repeater may receive the amplified fire alarm signal from the sensing modules, and when receiving the amplified fire alarm signal, the repeater may transmit the signal to each of the plurality of sensing modules after the first time elapses.

The repeater may include an alarm unit including a speaker and configured to generate a warning alarm, a first communication unit configured to receive the fire alarm signal from each of the plurality of sensing modules and transmit the signal to each of the plurality of sensing modules, a second communication unit configured to transmit the fire alarm signal to the server, a first power supply unit configured to receive first power from the outside, a second power supply unit configured to supply a second power, a first button configured to initialize the repeater, a second button configured to stop the warning alarm, and a third button configured to transmit a preliminary fire alarm signal to the server.

The server may include a memory in which information of parties corresponding to the address value is stored, a transmission unit configured to transmit a fire alarm message to the parties, and a reception unit configured to receive the fire alarm signal and the preliminary fire alarm signal from the repeater.

The acknowledgment response and the control signal may be provided in the same data frame.

Advantageous Effects

According to the present invention, the acknowledgment response and the control signal may be provided and transmitted in the same data frame. Signal transmission efficiency may be improved by transmitting signals having various information including acknowledgment response and control signals as a single communication means called signals. In addition, signal processing and signal management may be performed stably by excluding a case in which one of the acknowledgment response and the control signal is not transmitted.

According to the present invention, the first time required between the transmission of the signal and the fire alarm signal may be the minimum required time for transmitting a response as soon as the fire alarm signal is received. The plurality of sensing modules and the repeater may communicate with each other quickly. In a fire situation, a fire alarm apparatus may induce a quick response.

According to the present invention, when the repeater receives a fire alarm signal from a plurality of sensing modules, the repeater may transmit the signal. Since the acknowledgment response and the control signal are transmitted integrally in one data frame, the traffic density may be reduced. Therefore, it is possible to prevent a plurality of signals transmitted between the repeater and the plurality of sensing modules from being lost, it is possible to prevent interference between the plurality of signals transmitted between the repeater and the plurality of sensing modules, and it is possible to prevent data loss from occurring when a plurality of signals transmitted between the repeater and the plurality of sensing modules are transmitted.

MODE FOR CARRYING OUT THE INVENTION

Figure 1:
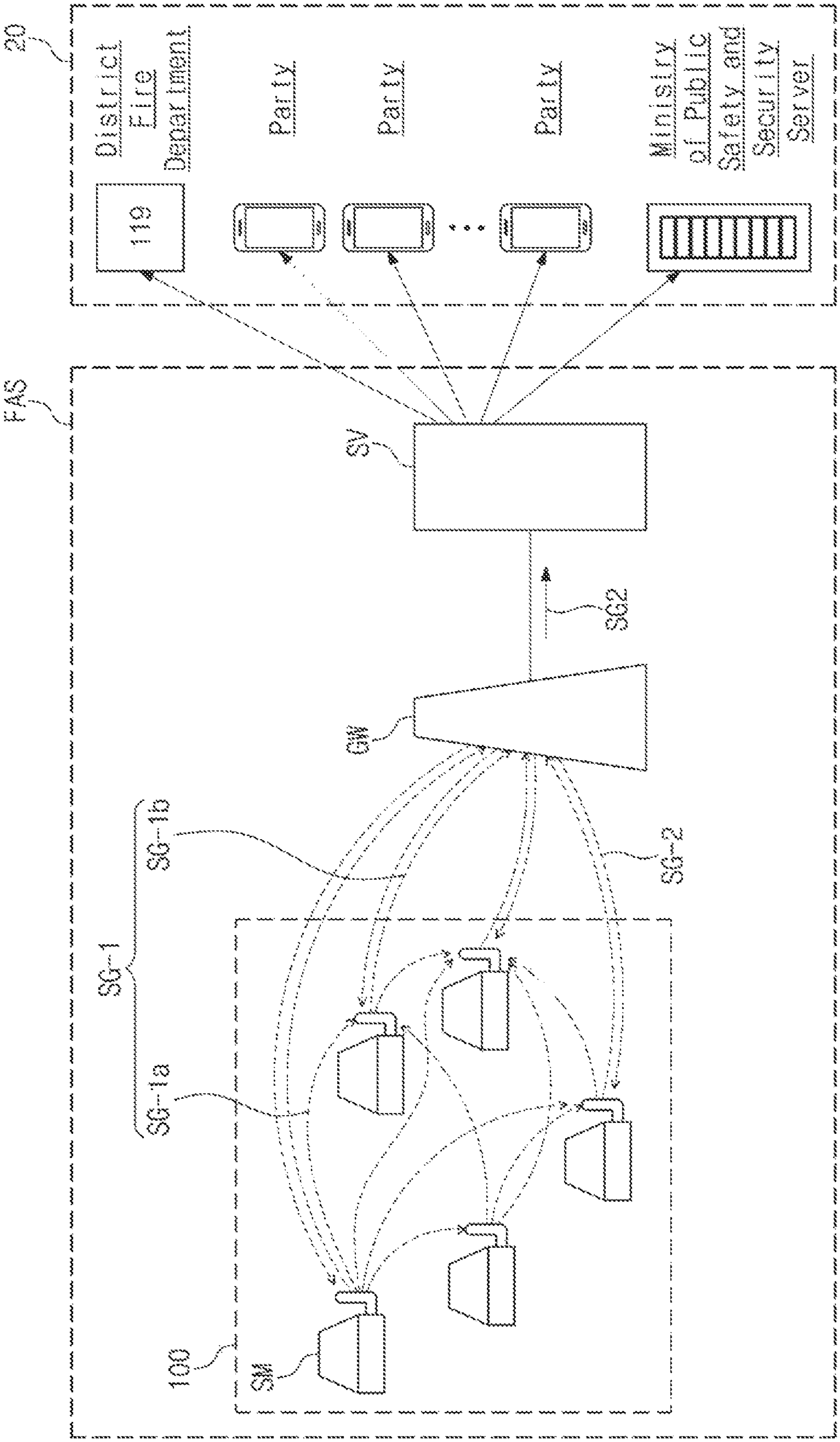
FIG. 1 shows a fire alarm apparatus according to an embodiment of the present invention.

In this specification, when an element (or region, layer, part, etc.) is referred to as being "on", "connected to", or "coupled to" another element, it means that it may be directly placed on/connected to/coupled to other components, or a third component may be arranged between them.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the present invention. The terms of a singular form may include plural forms unless otherwise specified.

In addition, terms such as "below", "the lower side", "on", and "the upper side" are used to describe a relationship of components shown in the drawing. The terms are described as a relative concept based on a direction shown in the drawing.

Unless otherwise defined, all terms (including technical and scientific terms) used herein have the same meaning as commonly understood by one of ordinary skill in the art to which this present invention belongs. In addition, terms defined in a commonly used dictionary should be interpreted as having a meaning consistent with the meaning in the context of the related technology, and unless interpreted in an ideal or overly formal sense, the terms are explicitly defined herein.

In various embodiments of the present invention, the term "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the present invention will be described with reference to the drawings.

Figure 2:
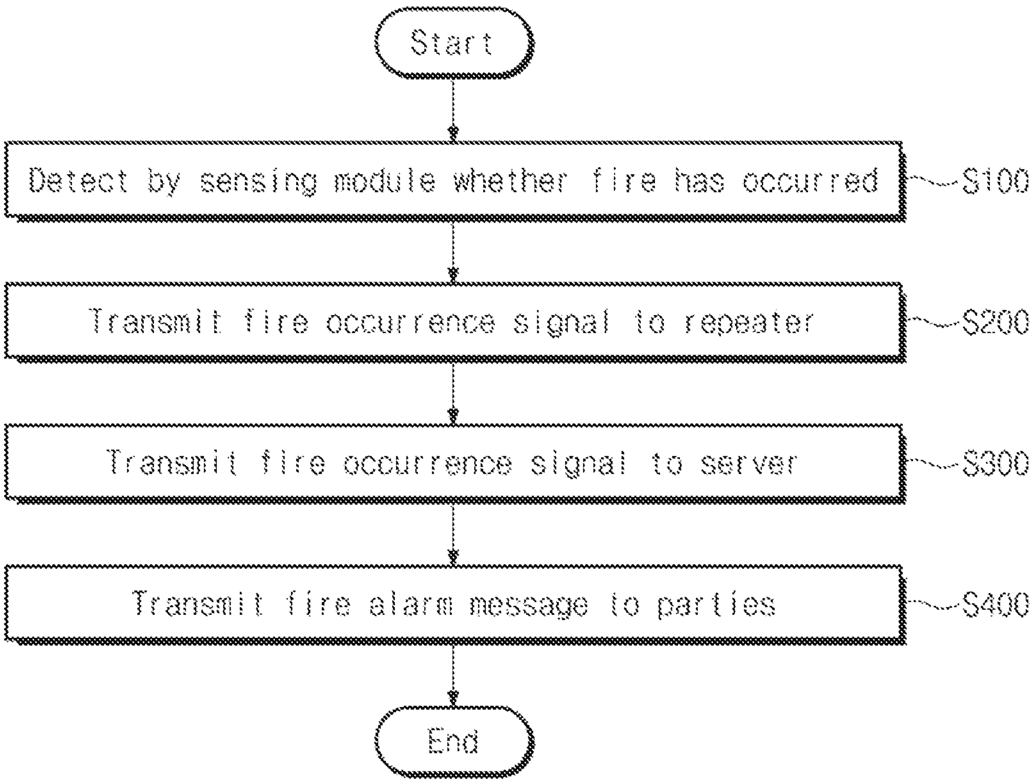
FIG. 2 is a flowchart illustrating a method of operating a fire alarm apparatus according to an embodiment of the present invention.

FIG. 1 is a view showing a fire alarm apparatus according to an embodiment of the present invention, and FIG. 2 is a flowchart illustrating a method of operating the fire alarm apparatus according to an embodiment of the present invention.

Referring to FIGS. 1 and 2, a fire alarm apparatus FAS may include a sensing unit 100, a repeater GW, and a server SV.

The sensing unit 100 may detect whether a fire has occurred. The sensing unit 100 may include a plurality of sensing modules SM. Although FIG. 1 illustrates five sensing modules SM by way of example, the number of the plurality of sensing modules SM according to an embodiment of the present invention is not limited thereto. For example, the plurality of sensing modules SM may be provided in 1000 to 2000 per one repeater GW to be connected to the repeater GW.

Each of the plurality of sensing modules SM may detect whether a fire has occurred (S100). Each of the plurality of sensing modules SM may generate a fire alarm signal SG-1. Each of the plurality of sensing modules SM may transmit a fire alarm signal SG-1 to adjacent sensing modules SM and/or the repeater GW (S200).

Each of the plurality of sensing modules SM may include a unique address value. The address value may include a product number or a manufacturing number. The address value may be transmitted through a fire alarm signal SG-1.

When the repeater GW receives the fire alarm signal SG-1, the repeater GW may transmit the signal SG-2 to the sensing module SM that has transmitted the fire alarm signal SG-1.

The fire alarm signal SG-1 may include a first signal SG-1*a* and a second signal SG-1*b*. The first signal SG-1*a* may be a signal generated by the sensing module SM that detects whether a fire has occurred. The second signal SG-1*b* may be a signal amplified by the sensing module SM. The first signal SG-1*a* and the second signal SG-1*b* will be described later.

As a method of transmitting the fire alarm signal SG-1 and the signal SG-2, a radio frequency (RF) communication method may be used. The RF communication method may be a communication method for exchanging information by radiating a RF. The RF communication method is a broadband communication method using frequency, and may be less affected by climate and environment, and may have high stability. In the RF communication method, voice or other additional functions may be interlocked and the transmission speed may be high. For example, the RF communication method may use a frequency of 447 MHz to 924 MHz. However, this is exemplary and in an embodiment of the present invention, a communication method such as Ethernet, Wifi, LoRA, M2M, 3G, 4G, LTE, LTE-M, Bluetooth, or WiFi Direct may be used.

In an embodiment of the present invention, the RF communication method may include a Listen Before Transmission (LBT) communication method. This is a frequency selection method that determines whether the selected frequency is being used by another system and selects another frequency when it is determined that the selected frequency is occupied. For example, a node that intends to transmit may first listen to the medium, determine if it is in an idle state, and then flush the backoff protocol prior to transmission. By distributing data using this LBT communication method, collisions between signals in the same band may be prevented.

The repeater GW may receive a fire alarm signal SG-1 from a plurality of sensing modules SM. The repeater GW may convert the fire alarm signal SG-1 into a transmission signal SG2. The repeater GW may transmit a transmission signal SG2 to the server SV (S300). The transmission signal SG2 may transmit the address value of each of the plurality of sensing modules SM.

The RF communication method may be used as a method for transmitting the transmission signal SG2. However, this is exemplary and in an embodiment of the present invention, a communication method such as Ethernet, Wifi, LoRA, M2M, 3G, 4G LTE, LTE-M, Bluetooth, or WiFi Direct may be used. However, this is exemplary and the method of transmitting the transmission signal SG2 according to an embodiment of the present invention is not limited thereto. For example, the transmission signal SG2 may be transmitted through a wire such as an Ethernet communication method.

The server SV may transmit a fire alarm message to the plurality of parties 20 using the transmission signal SG2 received from the repeater GW (S400).

The plurality of parties 20 may include, for example, a fire station, parties where a fire occurred, the Ministry of Public Safety and Security (or public institutions related to public safety), and the like. The plurality of parties 20 may receive the fire alarm message in the form of a text message, a video message, or a voice message through a landline phone, a smart phone, or other mobile terminal.

Figure 3:
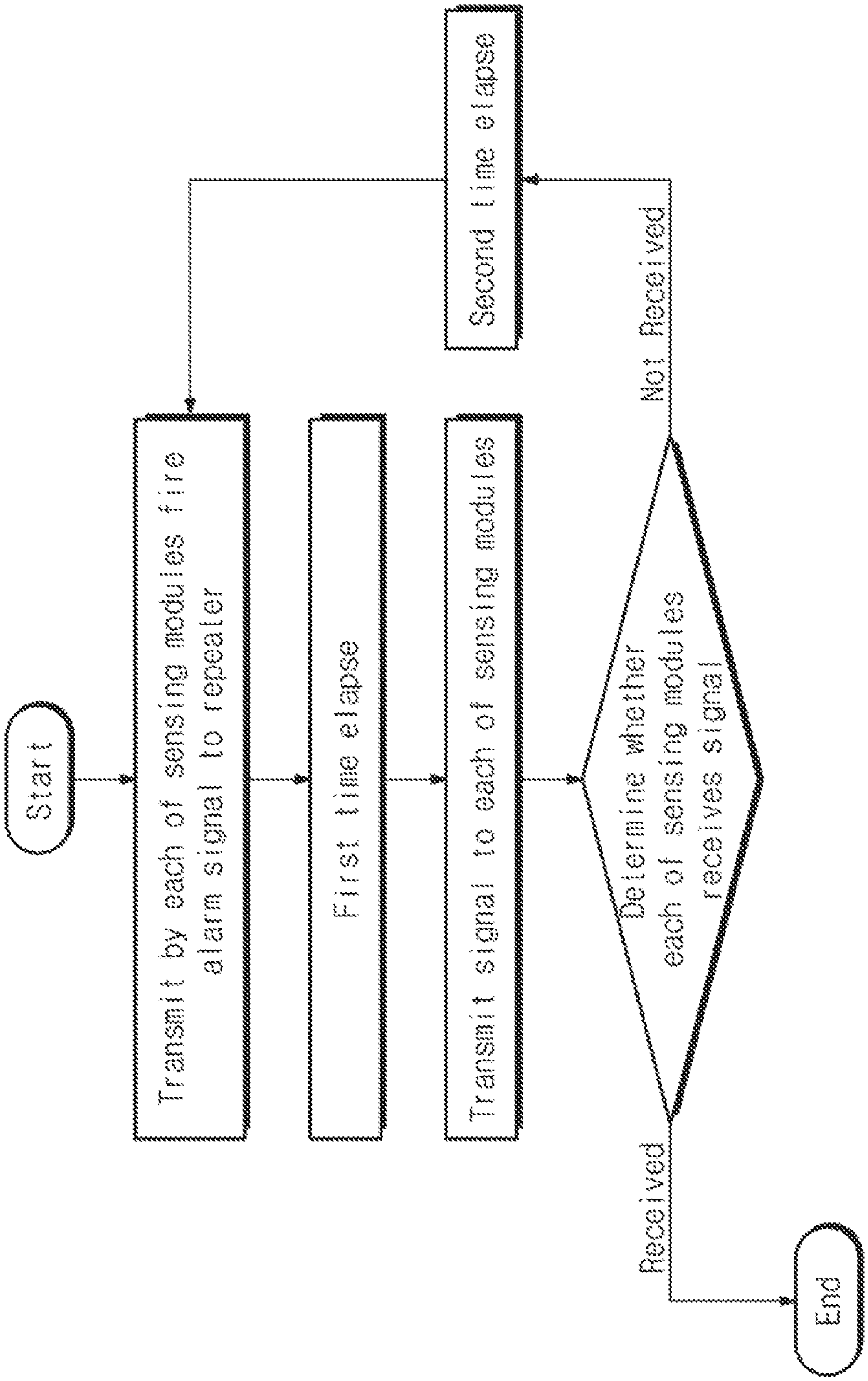
FIG. 3 is a flowchart illustrating a communication method of a plurality of sensing modules and a repeater according to an embodiment of the present invention.
Figure 4:
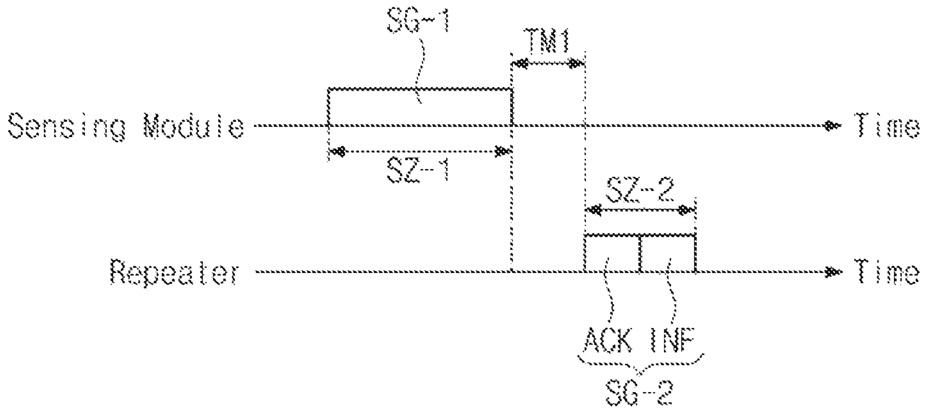
FIG. 4 is a diagram illustrating a fire occurrence signal and a manner in which the signal operates according to an embodiment of the present invention.

FIG. 3 is a flowchart illustrating a communication method of a plurality of sensing modules and a repeater according to an embodiment of the present invention and FIG. 4 is a diagram illustrating a fire occurrence signal and a manner in which the signal operates according to an embodiment of the present invention.

Referring to FIGS. 1, 3, and 4, each of the plurality of sensing modules SM may transmit a fire alarm signal SG-1 to the repeater GW. When a fire alarm signal SG-1 is received, the repeater GW may determine the sensing module SM that has transmitted the fire alarm signal SG-1 based on the address value included in the fire alarm signal SG-1.

The repeater GW may transmit the signal SG-2 after a first time TM1 has elapsed to the sensing module SM that has transmitted the fire alarm signal SG-1.

The signal SG-2 may include an acknowledgment response ACK and a control signal INF. The acknowledgment response ACK and the control signal INF may be integrally transmitted to the plurality of sensing modules SM.

According to the present invention, the acknowledgment response ACK and the control signal INF may be provided and transmitted in the same data frame. Signal transmission efficiency may be improved by transmitting signals having various information including an acknowledgment response ACK and a control signal INF together as one communication means called the signal SG-2. In addition, the signal SG-2 excludes a case in which one of the acknowledgment response ACK and the control signal INF is not transmitted, thereby stably performing signal processing and signal management. Accordingly, it is possible to provide a fire alarm apparatus FAS with improved reliability.

The acknowledgment response ACK may be a signal that acknowledgment-responds to the plurality of sensing modules SM that the fire alarm signal SG-1 is normally received.

The control signal INF may be a signal for controlling each of the plurality of sensing modules SM. The control signal INF may be information for initializing states of the plurality of sensing modules SM. The plurality of sensing modules SM may stop transmitting the fire alarm signal SG-1 to the repeater GW upon receiving the control signal INF. However, this is exemplary and the control signal INF according to an embodiment of the present invention is not limited thereto. For example, the control signal INF according to an embodiment of the present invention may include a signal including each of various pieces of information. Although one control signal INF is illustrated in FIG. 3, the number of control signals INF according to an embodiment of the present invention is not limited thereto. For example, a plurality of control signals INF according to an embodiment of the present invention may be provided.

The magnitude SZ-1 of the fire alarm signal SG-1 may be greater than the magnitude SZ-2 of the signal SG-2. The traffic density when the fire alarm signal SG-1 is transmitted may be smaller than the traffic density when the signal SG-2 is transmitted.

The first time TM1 may be a short inter-frame space (SIFS). The first time TM1 may be the shortest waiting delay time. Accordingly, the signal SG-2 may have the highest priority in being transmitted to the plurality of sensing modules SM. The first time TM1 may be the sum of the processing time of the received fire alarm signal SG-1 and the time required for transmitting a response.

According to the present invention, the first time TM1 may be the minimum required time for transmitting a response as soon as the fire alarm signal SG-1 is received. The plurality of sensing modules SM and the repeater GW may communicate with each other quickly. In a fire situation, a fire alarm apparatus FAS may induce a quick response. Accordingly, it is possible to provide a fire alarm apparatus FAS with improved reliability.

Unlike the present invention, when the repeater GW receives a fire alarm signal SG-1 from a plurality of sensing modules SM, transmits an acknowledgment response, and then separately transmits a control signal, the amount of a plurality of signals transmitted between the repeater GW and the plurality of sensing modules SM may increase, thereby increasing the traffic density. Accordingly, a plurality of signals transmitted between the repeater GW and the plurality of sensing modules SM may be lost, interference may occur between the plurality of signals transmitted between the repeater GW and the plurality of sensing modules SM, and data loss may occur when a plurality of signals transmitted between the repeater GW and the plurality of sensing modules SM are transmitted. However, according to the present invention, when the repeater GW receives a fire alarm signal SG-1 from a plurality of sensing modules SM, the repeater GW may transmit a signal SG-2 including an acknowledgment response ACK and a control signal INF. Since the acknowledgment response ACK and the control signal INF are transmitted integrally in one data frame, traffic density may be reduced. It is possible to reduce the amount of a plurality of signals transmitted between the repeater GW and the plurality of sensing modules SM. The amount of traffic between the repeater GW and the plurality of sensing modules SM may be reduced. Therefore, it is possible to prevent a plurality of signals transmitted between the repeater GW and the plurality of sensing modules SM from being lost, it is possible to prevent interference between the plurality of signals transmitted between the repeater GW and the plurality of sensing modules SM, and it is possible to prevent data loss from occurring when a plurality of signals transmitted between the repeater GW and the plurality of sensing modules SM are transmitted. Accordingly, it is possible to provide a fire alarm apparatus FAS with improved reliability for transmitting a plurality of signals transmitted between the repeater GW and the plurality of sensing modules SM.

When each of the plurality of sensing modules SM does not receive the signal SG-2, the fire alarm signal SG-1 may be retransmitted to the repeater GW after a second time. The second time period may be 1 minute. However, this is exemplary and the second time according to an embodiment of the present invention is not limited thereto. For example, the second time period may be defined in various ways according to a communication state between the repeater GW and the plurality of sensing modules SM.

Figure 5:
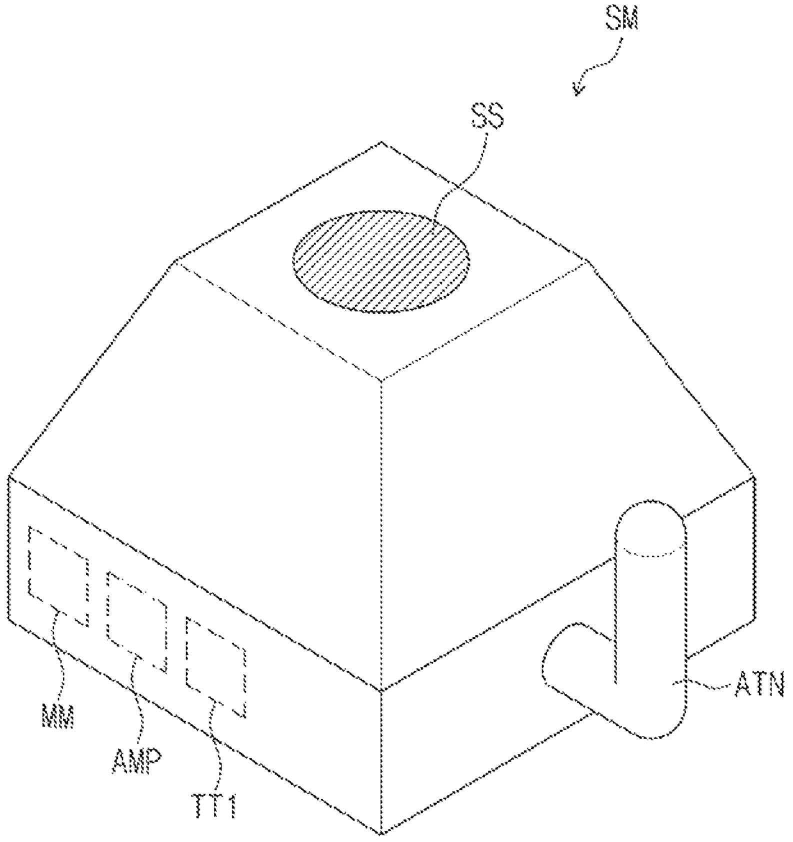
FIG. 5 is a perspective view of one sensing module among a plurality of sensing modules according to an embodiment of the present invention.

FIG. 5 is a perspective view of one sensing module among a plurality of sensing modules according to an embodiment of the present invention.

Referring to FIGS. 1 and 5, each of the plurality of sensing modules SM may include a unique address value. Any one of the plurality of sensing modules SM may include a sensor SS, a sensing memory MM, an amplification unit AMP, a communication unit ATN, and a first battery TT1.

The sensor SS may detect at least one of smoke, temperature, humidity, and gas. The sensor SS may generate a fire detection signal when it is determined that a fire has occurred by detecting at least one of smoke, temperature, humidity, and gas. In FIG. 4, one sensor SS is illustrated by way of example, but the present invention is not limited thereto. For example, each of the plurality of sensing modules SM may include a plurality of sensors, and each of the plurality of sensors may detect at least one of smoke, temperature, humidity, and gas.

The sensing memory MM may store information about the sensor SS. The sensing module SM may automatically determine a modulation method for a signal generated by the mounted sensor SS through information stored in the sensing memory MM. Through such an automatic modulation method, even if any type of sensors are mounted on each of the plurality of sensing modules SM, the fire alarm signal SG-1 may be easily set to be transmitted. The sensing memory MM may store the address value.

The sensing memory MM may include a volatile memory or a non-volatile memory. Volatile memory may include DRAM, SRAM, flash memory, or FeRAM. Non-volatile memory may include SSD or HDD.

The communication unit ATN may transmit a fire alarm signal SG-1 to the repeater GW. The communication unit ATN may also transmit a fire alarm signal SG-1 to other adjacent sensing modules SM. When the sensing module SM and the repeater GW are far away from each other and it is difficult to directly transmit the fire alarm signal SG-1, the communication unit ATN may stably transmit a signal to the repeater GW by transmitting the fire alarm signal SG-1 to another adjacent sensing module SM. The communication unit ATN may receive a fire alarm signal SG-1 from another adjacent sensing module SM.

The amplification unit AMP may amplify and convert the first signal SG-1*a* into the second signal SG-1*b*.

The first battery TT1 may supply power to the sensor SS, the sensing memory MM, the amplification unit AMP, and the communication unit ATN.

The communication unit ATN according to an embodiment of the present invention may use an RF communication method. The RF communication method may consume less power. Power use of the sensing module SM may be minimized, and the sensing module SM may be driven with low power. Accordingly, the first battery TT1 may stably supply power to the sensor SS, the sensing memory MM, the amplification unit AMP, and the communication unit ATN for a long time.

Figure 6:
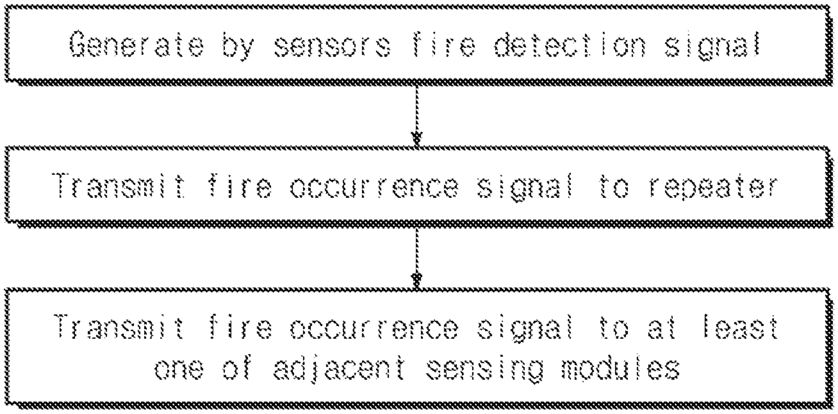
FIG. 6 is a flowchart illustrating a method by which a communication unit operates.

FIG. 6 is a flowchart illustrating a method in which a communication unit operates according to an embodiment of the present invention.

Referring to FIGS. 1, 5, and 6, when receiving a fire occurrence signal from the sensor SS, the communication unit ATN may transmit a first signal SG-1*a* to the repeater GW. When receiving the fire occurrence signal from the sensor SS, the communication unit ATN may transmit the first signal SG-1*a* to at least one of the plurality of adjacent sensing modules SM.

Figure 7:
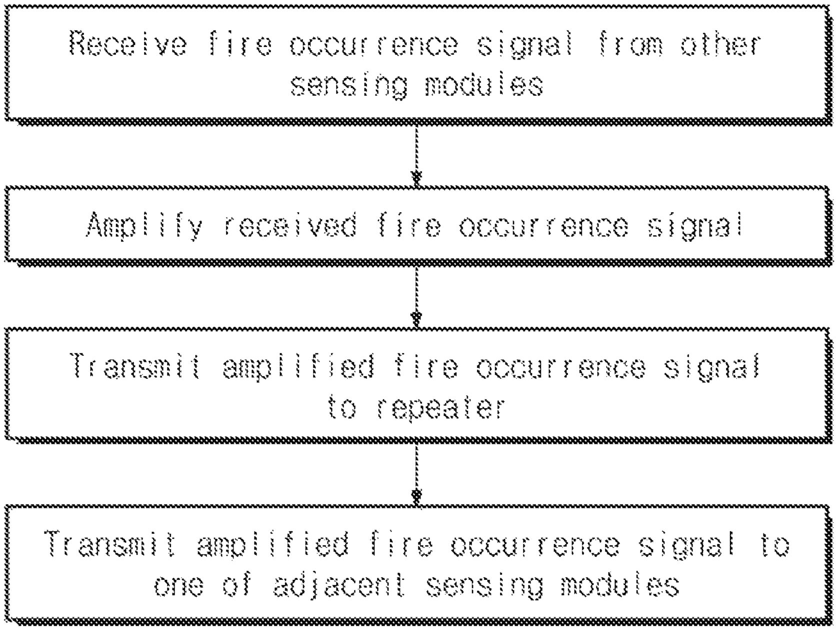
FIG. 7 is a flowchart illustrating a method by which a communication unit operates according to another embodiment.

FIG. 7 is a flowchart illustrating a method in which a communication unit operates according to an embodiment of the present invention.

Referring to FIGS. 1, 5, and 7, the communication unit ATN may receive a first signal SG-1*a* from another sensing module SM. In the process of receiving the received first signal SG-1*a* from another adjacent sensing module SM, the transmission rate and accuracy may be deteriorated due to the transmission distance and noise. The amplification unit AMP may amplify the degraded first signal SG-1*a*. A transmission rate and accuracy of the amplified first signal SG-1*a* may be improved. The amplified first signal SG-1*a* may be the second signal SG-1*b*. The communication unit ATN may transmit the second signal SG-1*b* to the repeater GW. The communication unit ATN may transmit the second signal SG-1*b* to at least one of the plurality of adjacent sensing modules SM. The second signal SG-1*b* may increase accuracy, transmission rate, and transmission distance of a signal transmitted between the plurality of sensing modules SM and the repeater GW.

The second signal SG-1*b* according to an embodiment of the present invention may be transmitted to another adjacent sensing module SM and amplified again in the amplification unit AMP of the other adjacent sensing module SM.

According to the present invention, the fire alarm apparatus FAS may stably transmit data to the plurality of sensing modules SM and the repeater GW using the amplification unit AMP. Accordingly, it is possible to provide a fire alarm apparatus FAS with improved reliability.

Figure 8:
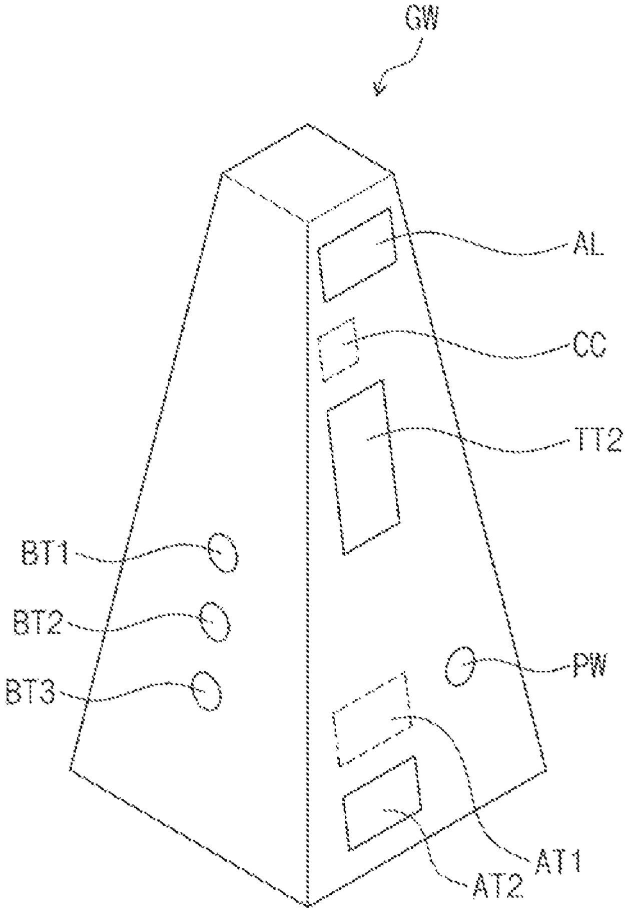
FIG. 8 is a perspective view of a repeater.

FIG. 8 is a perspective view of a repeater according to an embodiment of the present invention.

Referring to FIGS. 1 and 8, the repeater GW may include a first communication unit AT1, a second communication unit AT2, a power supply unit PW, a second battery TT2, a controller CC, an alarm unit AL, a first button BT1, a second button BT2, and a third button BT3.

The first communication unit AT1 may communicate with each of the plurality of sensing modules SM. The first communication unit AT1 may receive a fire alarm signal SG-1 from each of the plurality of sensing modules SM. The first communication unit AT1 may transmit the signal SG-2 to each of the plurality of sensing modules SM. The first communication unit AT1 and the communication unit ATN of each of the plurality of sensing modules SM may communicate wirelessly through an RF communication method.

The second communication unit AT2 may communicate with the server SV. The second communication unit AT2 may transmit a transmission signal SG2 to the server SV.

The power supply unit PW may receive the first power from the outside. The first power may supply power to the first communication unit AT1, the second communication unit AT2, the control unit CC, and the alarm unit AL.

The second battery TT2 may supply a second power. The second power may supply power to the first communication unit AT1, the second communication unit AT2, the control unit CC, and the alarm unit AL.

According to the present invention, the second battery TT2 supplies the second power even when the first power supplied from the power supply unit PW is cut off so that the repeater GW may operate. The repeater GW may stably receive the fire alarm signal SG-1 from the plurality of sensing modules SM. The repeater GW may stably transmit the signal SG-2 to the plurality of sensing modules SM. The repeater GW may stably transmit the transmission signal SG2 to the server SV. Accordingly, it is possible to provide a fire alarm apparatus FAS with improved reliability.

The control unit CC may convert the fire alarm signal SG-1 into a transmission signal SG2. When receiving the fire alarm signal SG-1, the control unit CC may generate the signal SG-2. When the first power is not supplied from the power supply unit PW to the first communication unit AT1, the second communication unit AT2, the control unit CC, and the alarm unit AL, the control unit CC may supply the second power from the second battery TT2 to the first communication unit AT1, the second communication unit AT2, the control unit CC, and the alarm unit AL.

The alarm unit AL may generate warning alarms. The alarm unit AL may include a speaker that provides the warning alarms. The warning alarms may include a first warning alarm, a second warning alarm, and a third warning alarm. The first warning alarm, the second warning alarm, and the third warning alarm may provide different sounds. The alarm unit AL according to an embodiment of the present invention may further include a light emitting unit including an LED. The alarm unit AL may provide different light to each of the first to third warning alarms through the light emitting unit.

When the second power is supplied through the second battery TT2, the alarm unit AL may provide the first warning alarm through the speaker. The alarm unit AL may notify the user that the first power is not being supplied from the power supply unit PW through the first warning alarm. The user may take quick action by checking the power supply unit PW.

According to the present invention, the repeater GW may maintain power so that the transmission signal SG2 is stably transmitted to the server SV. Accordingly, it is possible to provide a fire alarm apparatus FAS with improved reliability.

When the repeater GW receives the fire alarm signal SG-1, the alarm unit AL may provide the second warning alarm through the speaker. The alarm unit AL may notify the user that at least one of the plurality of sensing modules SM has detected a fire through the second warning alarm.

In relation to at least one of the plurality of sensing modules SM, when the first battery TT1 (see FIG. 4) runs out of power, the communication unit ATN (see FIG. 4) of the sensing module SM lacking power among the plurality of sensing modules SM may transmit a power shortage signal to the repeater GW. When the repeater GW receives the power shortage signal, the alarm unit AL may provide the third warning alarm through the speaker. The alarm unit AL may notify the user that through the third warning alarm, at least one first battery TT1 (see FIG. 4) of the plurality of sensing modules SM runs out of power such that power may not be supplied to at least one of the plurality of sensing modules SM. The user may supply power to the sensing unit SM by replacing the battery of the sensing module SM that is insufficient in power among the plurality of sensing modules SM.

According to the present invention, each of the plurality of sensing modules SM maintains power so that the sensor SS (see FIG. 4) stably detects a fire, and allows the fire alarm signal SG-1 to be stably transmitted to the repeater GW. Accordingly, it is possible to provide a fire alarm apparatus FAS with improved reliability.

The user may initialize the repeater GW by pressing the first button BT1 or applying a touch. For example, the first button BT1 may turn off or turn on the power of the repeater GW.

The user may stop the warning alarms provided from the alarm unit AL by pressing the second button BT2 or applying a touch. For example, the user may stop the warning alarms by using the second button BT2 after solving the cause of the warning alarms.

The user may transmit a preliminary fire alarm signal to the server SV by pressing the third button BT3 or applying a touch. The user may check the status between the server SV and the repeater GW by using the third button BT3. For example, although no fire occurred, the server SV may receive the preliminary fire alarm signal from the repeater GW and the server SV may transmit a fire alarm message to at least one of the parties 20. In this way, it may be checked whether the fire alarm apparatus FAS according to an embodiment of the present invention operates normally.

Figure 9:
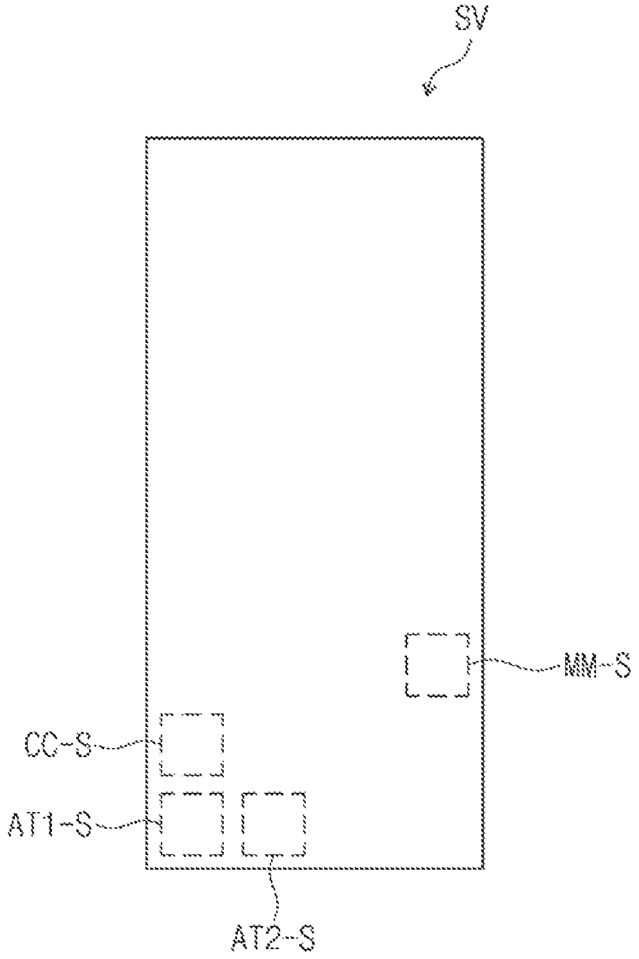
FIG. 9 is a diagram illustrating a server.
Figure 10:
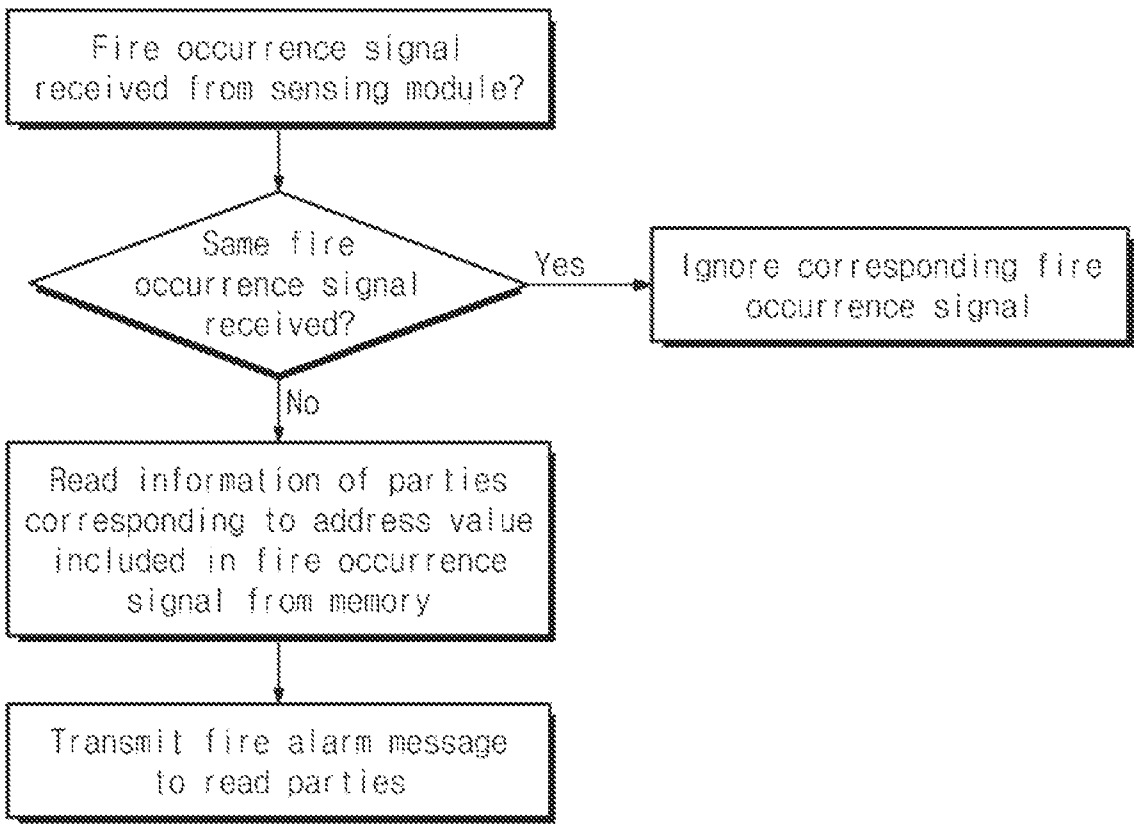
FIG. 10 is a flowchart illustrating a method of operating the server.

FIG. 9 is a diagram illustrating a server according to an embodiment of the present invention, and FIG. 10 is a flowchart illustrating a method of operating the server illustrated in FIG. 9 according to an embodiment of the present invention.

Referring to FIGS. 1, 9, and 10, the server SV may include a memory MM-S, a reception unit AT1-S, a transmission unit AT2-S, and a server control unit CC-S.

Information of the repeater GW may be stored in the memory MM-S. For example, the information of the repeater GW may include information of each of a plurality of sensing modules SM communicating with the repeater GW, the location of the repeater GW, or information of parties 20 associated with the repeater GW.

The information of each of the plurality of sensing modules SM communicating with the repeater GW may include an address value of each of the plurality of sensing modules SM and a location where each of the plurality of sensing modules SM is disposed. A location at which each of the plurality of sensing modules SM stored in the memory MM-S is disposed may match an address value of each of the plurality of sensing modules SM.

The information of the parties 20 may include contact information, addresses, or names. Information of the parties 20 stored in the memory MM-S may be matched with address values of each of the plurality of sensing modules SM.

The reception unit AT1-S may receive the transmission signal SG2 transmitted by the repeater GW.

The transmission unit AT2-S may transmit the fire alarm message to a terminal corresponding to each of the parties 20. The server SV may transmit the fire alarm message to the party 20 corresponding to the identified address value among the information of the parties 20 stored in the memory MM-S. At this time, the parties 20 corresponding to the identified address value may include the owner of the place where the fire occurred, the family of the owner of the place where the fire occurred, the owner of a place adjacent to the place of fire, district fire department, or related public institutions.

The server control unit CC-S may identify the transmission signal SG2 including the address value. If the identified transmission signal SG2 is the same as the previously identified transmission signal SG2, the server control unit CC-S may control the server SV to ignore the corresponding transmission signal SG2. If the identified transmission signal SG2 is different from the previously identified transmission signal SG2, the server control unit CC-S may control the transmission unit AT2-S to transmit a fire alarm message to the parties 20 corresponding to the address value identified in the memory MM-S. Through such control, it is possible to prevent the same fire alarm message from being repeatedly transmitted to the parties 20.

According to the present invention, the server control unit CC-S matches the address value of each of the plurality of sensing modules SM that detects whether a fire has occurred through the transmission signal SG2 with the information stored in the memory MM-S to identify a location where each of the plurality of sensing modules SM for detecting whether the fire has occurred is disposed. The server control unit CC-S may determine the location where the fire occurred through the location where each of the identified plurality of sensing modules SM is disposed. The transmission unit AT2-S may transmit the location of the fire to the terminals corresponding to each of the parties 20. The parties 20 may take quick action against the fire based on the location. Accordingly, it is possible to provide a fire alarm apparatus FAS with improved reliability.

Although described above with reference to a preferred embodiment of the present invention, a person skilled in the relevant technical field or a person having ordinary knowledge in the relevant technical field will be appreciated that various modifications and changes may be made to the present invention without departing from the spirit and scope of the present invention described in the claims to be described later. Accordingly, the technical scope of the present invention should not be limited to the contents described in the detailed description of the specification, but should be defined by the claims.

INDUSTRIAL APPLICABILITY

When a fire occurs, it is essential to respond to a fire to provide the user with information on whether a fire has occurred. Accordingly, the present invention related to a fire alarm system has high industrial applicability.

The invention claimed is:

1. A fire alarm apparatus comprising:

a plurality of sensing modules configured to generate a fire alarm signal by detecting fire occurrence with different address values and an amplified fire alarm signal from the fire alarm signal, and perform Radio Frequency (RF) communication with each other; and a repeater configured to perform RF communication with each of the plurality of sensing modules and receive the fire alarm signal from the plurality of sensing modules, wherein when receiving the fire alarm signal from each of the plurality of sensing modules, the repeater transmits a repeater signal to each of the plurality of sensing modules after a first time elapses, wherein the repeater signal comprises an acknowledgment response to the fire alarm signal and a control signal for controlling each of the plurality of sensing modules, wherein the acknowledgment response and the control signal are transmitted integrally in one data frame, and wherein the repeater receives the amplified fire alarm signal from the sensing modules, and when receiving the amplified fire alarm signal, the repeater transmits the repeater signal to each of the plurality of sensing modules after the first time elapses.

2. The fire alarm apparatus of claim 1, wherein the control signal initializes states of the plurality of sensing modules.

3. The fire alarm apparatus of claim 1, wherein a magnitude of the fire alarm signal is greater than a magnitude of the repeater signal.

4. The fire alarm apparatus of claim 1, wherein the first time is a short inter-frame space (SIFS).

5. The fire alarm apparatus of claim 1, wherein when the repeater signal is not received, each of the plurality of sensing modules retransmits the fire alarm signal to the repeater after a second time.

6. The fire alarm apparatus of claim 5, wherein the second time is 1 minute.

7. The fire alarm apparatus of claim 1, wherein when the repeater signal is received, each of the plurality of sensing modules stops transmitting the fire alarm signal.

8. The fire alarm apparatus of claim 1, further comprising a server communicating with the repeater.

9. The fire alarm apparatus of claim 8, wherein each of the plurality of sensing modules comprises:

a sensor configured to generate the fire alarm signal when it is determined as a fire situation by detecting at least one of smoke, temperature, humidity, and gas;

a sensing memory unit configured to store the address value;

an amplification unit configured to amplify the fire alarm signal received from at least one of a plurality of adjacent sensing modules to generate the amplified fire alarm signal; and a sensing communication unit configured to receive the fire alarm signal or the amplified fire alarm signal, transmit the fire alarm signal or the amplified fire alarm signal to at least one of the plurality of adjacent sensing modules and the repeater, and receive the repeater signal.

10. A fire alarm apparatus comprising:

a plurality of sensing modules configured to generate a fire alarm signal by detecting fire occurrence with different address values and perform Radio Frequency (RF) communication with each other;

a repeater configured to perform RF communication with each of the plurality of sensing modules and receive the fire alarm signal from the plurality of sensing modules, and a server communicating with the repeater, wherein when receiving the fire alarm signal from each of the plurality of sensing modules, the repeater transmits a repeater signal to each of the plurality of sensing modules after a first time elapses, wherein the repeater signal comprises an acknowledgment response to the fire alarm signal and a control signal for controlling each of the plurality of sensing modules, wherein the acknowledgment response and the control signal are transmitted integrally, wherein each of the plurality of sensing modules comprises:

a sensor configured to generate the fire alarm signal when it is determined as a fire situation by detecting at least one of smoke, temperature, humidity, and gas;

a sensing memory unit configured to store the address value;

an amplification unit configured to amplify the fire alarm signal received from at least one of a plurality of adjacent sensing modules to generate an amplified fire alarm signal; and a sensing communication unit configured to receive the fire alarm signal or the amplified fire alarm signal, transmit the fire alarm signal or the amplified fire alarm signal to at least one of the plurality of adjacent sensing modules and the repeater, and receive the repeater signal;

wherein the repeater receives the amplified fire alarm signal from the sensing modules, and when receiving the amplified fire alarm signal, the repeater transmits the repeater signal to each of the plurality of sensing modules after the first time elapses.

11. The fire alarm apparatus of claim 9, wherein the repeater comprises:

an alarm unit including a speaker and configured to generate a warning alarm;

a first communication unit configured to receive the fire alarm signal from each of the plurality of sensing modules and transmit the repeater signal to each of the plurality of sensing modules;

a second communication unit configured to transmit the fire alarm signal to the server;

a first power supply unit configured to receive a first power from the outside;

a second power supply unit configured to supply a second power;

a first button configured to initialize the repeater;

a second button configured to stop the warning alarm; and a third button configured to transmit a preliminary fire alarm signal to the server.

12. The fire alarm apparatus of claim 11, wherein the server comprises:

a memory in which information of parties corresponding to the address value is stored;

a transmission unit configured to transmit a fire alarm message to the parties; and a reception unit configured to receive the fire alarm signal and the preliminary fire alarm signal from the repeater.

13. The fire alarm apparatus of claim 1, wherein the acknowledgment response and the control signal are provided in the same data frame.

14. Method of operation of a fire alarm apparatus, the method comprising:

a plurality of sensing modules generating a fire alarm signal by detecting fire occurrence with different address values and an amplified fire alarm signal from the fire alarm signal, and performing Radio Frequency (RF) communication with each other; and a repeater performing RF communication with each of the plurality of sensing modules and receiving the fire alarm signal from the plurality of sensing modules, the repeater transmitting a repeater signal to each of the plurality of sensing modules after a first time elapses, wherein the repeater signal comprises an acknowledgment response to the fire alarm signal and a control signal for controlling each of the plurality of sensing modules, wherein the acknowledgment response and the control signal are transmitted integrally in one data frame, and wherein the repeater receives the amplified fire alarm signal from the sensing modules, and when receiving the amplified fire alarm signal, the repeater transmits the repeater signal to each of the plurality of sensing modules after the first time elapses.

* * * * *